United States Patent [19]
Miller

[11] Patent Number: 4,991,879
[45] Date of Patent: Feb. 12, 1991

[54] METHOD AND APPARATUS FOR JOINING TWO RELATIVELY MOVABLE MEMBERS

[76] Inventor: Dale L. Miller, 525 Nashua Rd., Liberty, Mo. 64068

[21] Appl. No.: 434,859

[22] Filed: Nov. 6, 1989

[51] Int. Cl.$^5$ .............................................. F16L 21/00
[52] U.S. Cl. ..................................... 285/236; 285/13
[58] Field of Search ................ 285/97, 107, 109, 235, 285/236, 13; 277/3, 34, 34.6, 75; 406/191, 182, 194, 196, 198; 55/16, 158; 5/453, 455

[56] References Cited

U.S. PATENT DOCUMENTS 4,694,521  9/1987  Tominaga ............................... 5/453
4,907,308  3/1990  Leininger et al. ................... 5/453 X Primary Examiner—Randolph A. Reese
Assistant Examiner—Heather Chun
Attorney, Agent, or Firm—Kokjer, Kircher, Bradley, Wharton, Bowman & Johnson

[57] ABSTRACT

This invention relates to flexible coupling devices and to a method of utilizing such a device. The invention encompasses an article of manufacture which is an inflatable member characterized by a gas permeability factor sufficient to accommodate the flow of gas through the member while the member remains inflated. This article can be used as a flexible coupling to retard the accumulation of solid particulate matter in the space between two spaced apart structures and also may be used to control heat buildup between two structures. The inventive method contemplates reducing dust accumulation between two structures by providing an inflatable gas permeable member which is inflated and then allowed to lose gas through at least one wall while additional gas is continually supplied so as to maintain inflation. The same method steps may be followed to provide a method of protecting against heat buildup and a slightly modified method, of where the inflatable member is periodically allowed to partially deflate may be employed to provide protection against reversals in pressure encountered in some situations.

15 Claims, 2 Drawing Sheets

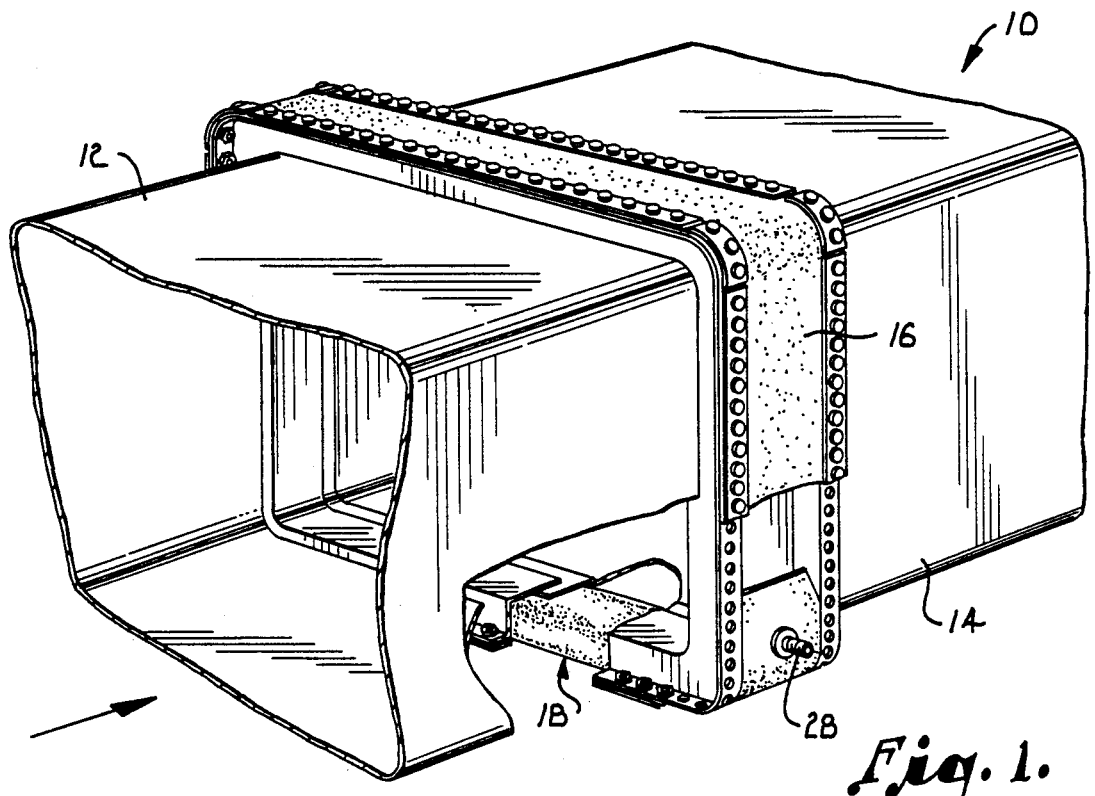
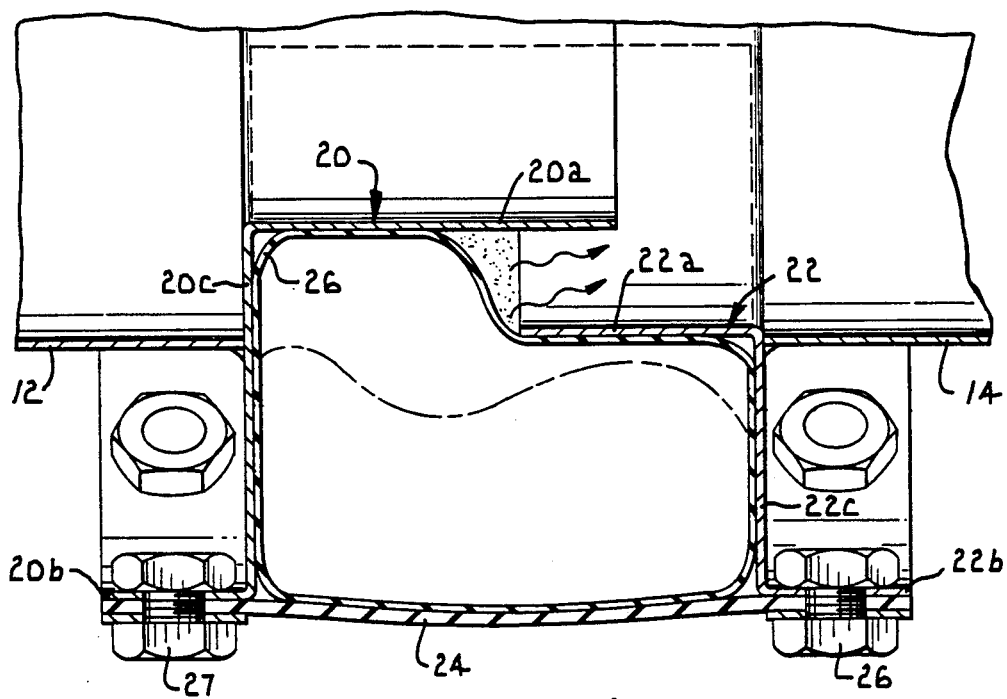

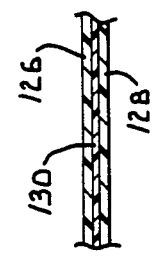
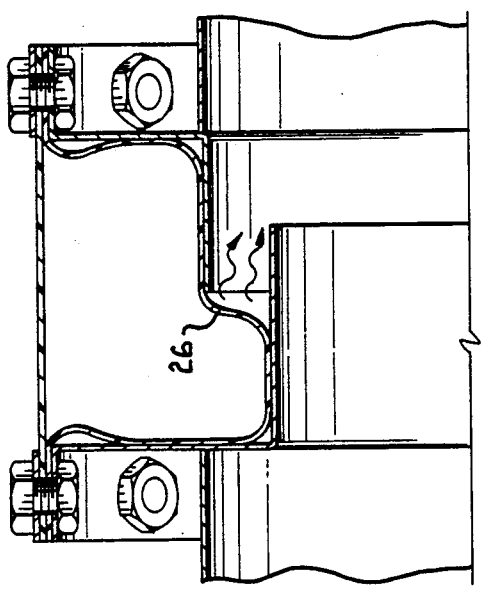
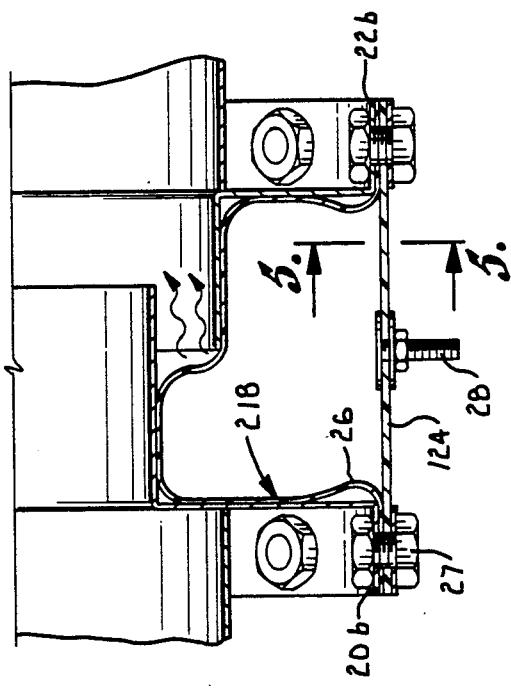
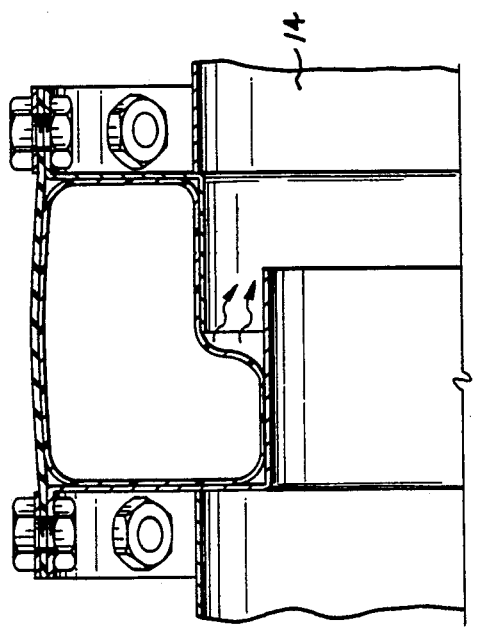
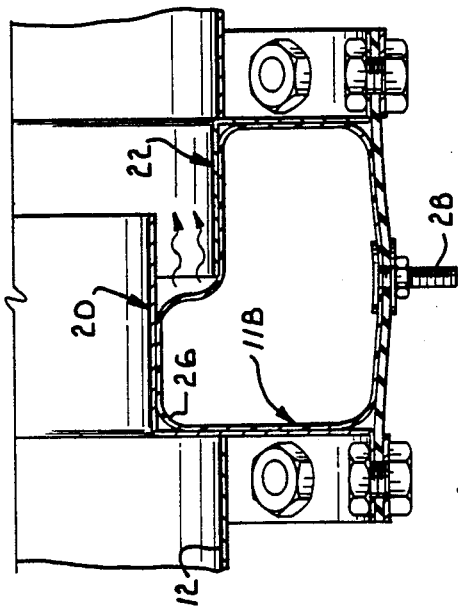

METHOD AND APPARATUS FOR JOINING TWO RELATIVELY MOVABLE MEMBERS

This invention relates generally to inflatable structures and, more particularly, to a method and device employing an inflatable member that is characterized by the ability to allow air or other gas to pass through the member while remaining inflated.

Inflatable structures have found many applications in industry. Inflatable structures are used to lift large heavy objects in emergency accidents. The present invention encompasses an improved inflatable structure for use in many conventional applications and also contemplates a method of controlling dust and heat buildup in gas conveying ductwork as well as protection against thermal degradation in other high temperature applications.

Coal burning power plants employ large ducts for removing the products of combustion. The mixture of air and other hot gases has a significant quantity of solid particulate matter, including dirt, unburned coal particles, and fly ash. The duct work for carrying these combustion products out of the plant normally includes at least some ducting which is subject to accumulation of solid particulate matter. Accumulation of this dust is particularly troublesome in the expansion joints between two duct sections that are substantially horizontal.

The problem of fly ash accumulation in the expansion joints of power plant ducts is presently addressed by providing "pillows" of fiberglass which are used to substantially fill the expansion joint space, particularly along the lower substantially horizontal surface of the duct. This is only a partial solution to the problem, however, since fly ash will continue to accumulate on and in the pillow and will eventually have to be removed. The problem is further enhanced by the condensation of moisture in the expansion joint, as a result of the temperature differential between the hot gas stream inside the duct and the ambient temperature outside of it. The moisture combines with the accumulated fly ash to create a cementitious type of material which eventually must be removed. A lifetime of 1-2 years for the aforedescribed fiberglass pillows is typical. Removal of the fly ash laden pillows after this period of time requires that the entire power plant be shut down and the hardened cementitious material be chiseled out of the ductwork.

Another problem encountered in power plant ductwork is that the flexible material which is used to couple the two duct sections together is subject to temperature degradation and has an expected lifetime of only about 5-7 years. When this material needs replacement, a power crane must be employed because of the extremely heavy nature of the material, making it impractical to install with manual labor only.

While the foregoing background of the invention has been discussed with particular reference to power plant ductwork, it will be appreciated that the problems described are applicable to any system where a gas stream having particulate matter entrained therein is conveyed through a duct, especially where a portion of the duct is substantially horizontal. The problems of temperature degradation of flexible couplings is also not limited to power plant ducts, but is encountered in numerous applications where two spaced apart objects are joined together by a flexible coupling and high temperatures tend to degrade the coupling.

The present invention addresses the foregoing problems by providing a method and article for controlling particle buildup in a duct for conveying a gas stream by utilizing an inflatable member that is characterized by an air permeability factor sufficient to accommodate the flow of air through the member while the member remains inflated. The invention also encompasses a method and article of manufacture that is applicable to numerous usages, including protection against thermal degradation, which article comprises an inflatable member having a gas permeability factor sufficient to accommodate the flow of air or other gas through the member while the member remains inflated.

It is, therefore, an object of the present invention to provide an article of manufacture which is an inflatable member that is characterized by a gas permeability factor sufficient to accommodate the flow of air or other gas through the member while the member remains inflated, thus providing protection against overinflation.

Another one of the objects of the invention is to provide an inflatable member which can be utilized in ductwork that terminates in a baghouse so that, when pressure in the system is reversed to clean the baghouse, the inflatable member can also be deflated which allows it to act as a flexible cushion to relieve the stress on adjoining flexible coupling material.

An important one of the aims of my invention is to provide a flexible coupling to be positioned between two spaced apart objects where there is a capability for the inflatable member to continuously pass air or other gas through it thereby precluding buildup of material on the surface of the flexible coupling member.

Still another object of the invention is to provide a flexible coupling for joining two objects that are spaced apart in a high temperature application whereby air or other gas is continuously passed through the coupling so as to substantially reduce temperature buildup and resulting thermal degradation.

Still another one of the objects of my invention is to provide a method of reducing dust accumulation and heat buildup between two spaced apart structures by providing an inflatable coupling through which air or other gas may continuously be passed to prevent the buildup of dust on the surface and also have a cooling effect.

Still another important aim of the invention is to increase the life of expansion joint couplings in gas conveying ductwork by providing a method and device which controls dust buildup and temperature buildup by continuously passing air or other gas through the coupling.

My invention has as another important object reducing the time and expense of replacing worn or damaged couplings in large ductwork by providing a relatively light-weight coupling that is filled with air or other gas and can be manually manipulated without power equipment.

Still another one of the objects of this invention is to provide a coupling member for use in ductwork and high temperature applications which is not only light-weight but relatively easy to make minor repairs on.

A further one of the aims of the present invention is to provide a coupling device for use in ductwork and high temperature applications which is capable of withstanding operating temperatures in the vicinity of 30 psi which is several times greater than the coupling material typically used for these applications.

These and other objects of the invention will be made clear or become apparent from the following description and drawings wherein:

FIG. 1 is a perspective view of a typical duct that would be employed in a coal burning power plant;

FIG. 2 is a vertical cross-sectional view taken through the lower horizontal section of the expansion joint between the two duct sections shown in FIG. 1;

FIG. 3 is another vertical cross-sectional view, similar to FIG. 2, illustrating an alternative form of the invention;

FIG. 4 is another vertical cross-sectional view illustrating another alternative embodiment; and FIG. 5 is a vertical cross-sectional view taken along line 5—5 of FIG. 4.

Referring initially to FIG. 1, a gas conveying duct which is positioned in a generally horizontal plane comprises at least two duct sections 12 and 14. The two sections are joined by a flexible sheet material 16 and the flexible coupling member according to the present invention is designated generally by the numeral 18 and is placed along the lower horizontal side of the duct.

Referring in greater detail to duct sections 12 and 14, each section is generally rectangular in cross-section and it should be understood that a typical cross-sectional area for a power plant duct is three square feet or larger. The duct could also be round or of any other cross-sectional configuration. Each of the two duct sections is identical except for complementary flanges 20 and 22 which are welded or otherwise secured to the two facing ends of the respective sections. Flange 20 is of a "reverse Z" configuration with a first horizontally projecting arm 20a which extends toward duct section 14, and a second horizontally projecting arm 20b which extends away from section 14. A vertical leg 20c extends between the two arms and serves as a means for attaching the flange to duct section 12 and also forms one side of the expansion space between the two duct sections.

Flange 22 which is rigid with duct section 14 includes an upper horizontal arm 22a which projects in the direction of duct section 12, a lower horizontal arm 22b which extends in the opposite direction, and a vertical leg 22c corresponding to leg 20c of the other flange. Thus, flange 22 is of a generally "Z" configuration with the two horizontal arms being more closely spaced than the arms of flange 20 so as to present a space between the respective arms 20a and 22a to accommodate expansion and contraction.

Duct sections 12 and 14 are coupled together by a flexible sheet material 24 that is secured by nut and bolt assemblies 27 which pass through lower arms 20b and 22b, respectively, of flanges 20 and 22.

The preferred embodiment of the coupling member according to the present invention is, as previously noted, designated by the numeral 18 in FIG. 1. Coupling 18 is formed from a sheet of material 26 which, when fully extended, will substantially occupy all of the space between the expansion flanges 20 and 22 of duct sections 12 and 14, respectively. Material 26 is sealed to present an inflatable bladder and is provided with an air valve 28 which projects outside of the duct at an accessible location. Material 26 is preferably glass fiber cloth impregnated with tetrafluroethylene resin. Other materials may be utilized so long as the end result is a flexible material characterized by an air permeability factor sufficient to accommodate the flow of air through the member while retaining enough air for the member to be inflated and stay inflated with the continued passage of air through it. It should also be understood that coupling member 18 could be formed from two integrally joined sheets of material, one sheet presenting the lower half and the other sheet presenting the upper half. The lower sheet could be made from resin-impregnated glass fibers which is coated to make an air impermeable material, while the upper sheet of material, which is sealingly joined to the lower sheet, is again made of material 26 to accommodate the passage of air through it.

In use, the coupling member 18 is installed in the space between flanges 20 and 22 which form the expansion joint for duct sections 12 and 14. Coupling 18 is supported by the vertical legs 20c and 22c of the respective flanges and sheet material 24. The coupling is placed in communication with an air supply through valve 28. The coupling is inflated utilizing "house air" or air from a supplemental supply system. The coupling member is generally inflated to a pressure of between about 1 and 2 psi and is maintained at this pressure while the permeability factor of material 26 causes air to pass through the wall of the coupling at a given rate once the desired operating pressure is reached.

The duct 10 typically handles combustion gases which are mixed with fly ash and other dust particles. It will b understood that the invention is applicable to keeping any solid particulate material from building up inside of a pneumatic conveying enclosure. The direction of the flow of gas though the duct is indicated by the arrow at the far left of FIG. 1. Since air is passing through coupling 18 after the latter is inflated, as indicated by the arrows in FIG. 2, there is little tendency for fly ash or other dust particles to accumulate in the expansion or even on the exposed surface of the coupling member. Since operating temperatures of above 400° F. are encountered in power plant duct work, the temperature differential between the gases passing through duct 10 and the ambient air is substantial. Heretofore this has resulted in moisture condensation in the area of the expansion joint, thus creating a source of moisture for reaction with fly ash to form a cementitious type material. Utilizing the present invention, the continual passage of air through coupling 18 greatly reduces the temperature differential between the expansion joint and the adjoining ambient air, thus substantially precluding moisture condensation in the expansion joint area. Thus, even the relatively small amount of fly ash and dust particles which may still accumulate in the area of the expansion joint are not subject to reaction with moisture to the extent which has heretofore been the case.

Referring now to FIG. 3 an alternative embodiment of the invention is shown in and designated by the numeral 118. Coupling member 118 is identical to coupling 18 previously described except that it is of a size so that it can extend around the entire periphery of the open space presented by flanges 20 and 22. It will also be noted that valve 28 is placed in a different location then with coupling member 18 solely to improve accessibility.

Coupling member 118 may be employed where special circumstances require protection against buildup of particulate matter around the entire periphery of two spaced apart structures or where thermal protection is needed around the entire perimeter. As with the preferred embodiment of the invention previously described, coupling 118 may be formed of two separate sheets of material which are sealingly joined so as to present an air permeable and an air impermeable side. Coupling 118 may also be formed entirely from material 26 previously described characterized by the specified air impermeability factor. It will be appreciated that structures other than ducts can be protected from high temperatures utilizing the present invention. For example, two sections of a boiler may be coupled with the member 118 providing thermal protection at the coupling joint.

Still another embodiment of the invention is illustrated in FIG. 4 and is designated generally by the numeral 218. Coupling member 218 comprises a sheet of material 26 of the type previously described which material is joined to the arms 20b and 22b of the respective flanges 20 and 22. In this instance, material 26 is secured to the flanges by nut and bolt assemblies 27. The outside of coupling member 218 is presented by flexible sheet material 124, the construction of which is shown in detail in FIG. 5. Sheet material 124 is a three-layer laminate comprised of two layers 126 and 128 which are formed from glass fiber cloth impregnated With polytetrafluroethyelene resin, and a third layer 130 which is not air penetrable. An air valve 28 is provided through material 124 to allow for inflation of the coupling.

Coupling member 218 may be used for occupying the space between flanges 20 and 22 in the same manner as previously described for the preferred embodiment 18. Like embodiment 118 previously described, coupling member 218 may be employed around the entire periphery of the two structures to be joined so as to provide protection against particulate material buildup or heat degradation, or both.

It will be appreciated that the invention encompasses a flexible coupling for positioning between two spaced apart structures for the purpose of retarding accumulation of solid particulate material in the space or for maintaining temperature control in the space or both. While the invention has been described with particular reference to expansion joints used in power plant duct work, it will be understood that the invention encompasses an article of manufacture that is adapted to be positioned between any two spaced apart objects. This article could even be utilized as a device for lifting heavy objects with the article having the inherent design feature that it is not subject to over inflation under normal usage.

The invention also encompasses a method of reducing dust accumulation in the space between two structures to which a gas stream carrying the dust passes while also precluding any heat buildup that would be of a magnitude to cause thermal degradation if not controlled. The method includes the steps of providing an inflatable member which is air permeable along at least one side and positioning this member in the space to be protected. The member is then inflated and air is allowed to pass through the member at a rate adequate to retard dust accumulation or heat buildup while the inflating step is continued at a rate sufficient to preclude deflation of the member.

Still another very useful application of the invention is as a method for protecting expansion couplings in duct systems that terminate in a bag house from wear caused by reversing the pressure on the bag house. In this method the device of the invention would be installed as previously described and when the bag house pressure is reversed so as to clean off the inside of the bag, the back pressure on the inflatable coupling member causes partial deflation of the inflatable member. This partial deflation of the coupling member serves as a cushion to reduce the flexing on the flexible sheet, such as 124, which joins two duct sections together.

The preferred material which is utilized in carrying out the invention is relatively light weight and can be easily handled by manual labor without employing expensive equipment. The material can also be reliably patched if minor damage occurs. Because of the nature of the material which is utilized in carrying out the method and device of the invention, operating pressures of up to 30 psi can be employed without damage to the material. Also, the preferred material of the invention can withstand temperatures in excess of 500° F. If the device of the present invention is utilized, the life of the coupling material, such as flexible sheet 124, can be increased 2 to 3 times its present useful life of 5 to 6 years.

While the invention has been described with particular reference to use of air as the gas for filling the gas permeable cushion, it is to be understood that certain applications may dictate choice of a different gas, for example, carbon dioxide or freon to accomplish other objectives such as cooling.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

I claim:

1. A flexible coupling positioned between spaced apart first and second sections of a duct for conveying a gas stream carrying particulate material wherein said sections are coupled together to form a closed passage for said gas stream and said coupling acts to retard the accumulation of solid particulate material in the space between said structures, said coupling comprising:
   an inflatable member characterized by a gas permeability factor sufficient to accomodate the flow of gas through the member while the member remains inflated.

2. The invention of claim 1, wherein is included means for introducing gas into said member.

3. The invention of claim 1, wherein said sections are disposed in a substantially horizontal plane and said member is positioned along the bottom of said duct, said member having a first side next to the duct interior that is characterized by said permeability factor and a second opposite side that is gas impermeable.

4. The invention of claim 1, wherein said member extends around the periphery of said sections.

5. In a conduit system having a pair of conduit sections coupled together at a joint and presenting a space between the sections adjacent the joint, the improvement comprising:

an inflatable member characterized by a gas permeability factor sufficient to accommodate the flow of gas through the member while the member remains inflated; and means for mounting said member in said space.

6. The invention of claim 5, wherein is included means for introducing gas into said member.

7. The invention of claim 6, wherein said means for introducing gas comprises valve means adapted to be coupled with a gas source.

8. A flexible coupling positioned between first and second duct sections of a duct carrying a high temperature gas stream at a temperature of sufficient magnitude to cause thermal degradation of said coupling and including means for coupling said sections together to form a closed passage for said gas stream, said coupling comprising:

an inflatable member characterized by a gas permeability factor sufficient to accommodate the flow of gas through the member while the member remains inflated; and means for introducing gas into said member.

9. The invention of claim 8, wherein said member extends around the periphery of said sections.

10. A method of reducing dust accumulation in the space between two structures through which a gas stream carrying the dust passes, said method comprising:

providing an inflatable, gas permeable member in said space;

inflating said member;

allowing gas to pass through said member at a rate adequate to substantially retard dust accumulation; and continuing said inflating step at a rate sufficient to preclude deflation of said member.

11. A method as set forth in claim 10, wherein is included the additional steps of periodically allowing said member to deflate followed by rapid inflation.

12. A method as set forth in claim 10, wherein said member is characterized by substantially occupying said space when inflated.

13. A method of controlling heat buildup between two spaced apart structures, said heat buildup being of a magnitude to cause thermal degradation if not controlled, said method comprising:

providing an inflatable gas permeable member between said structures;

inflating said member;

allowing gas to pass through said member at a rate adequate to maintain the temperature in the space between said structures at below degradation levels; and continuing said inflating step at a rate sufficient to preclude deflation of said member.

14. A method as set forth in claim 13, wherein said member is characterized by substantially occupying said space when inflated.

15. A method of protecting the flexible coupling material in a gas duct system that is subject to reversals in pressure within the duct, said method comprising:

providing an inflatable, gas permeable member between said flexible coupling and the gas stream;

inflating said member;

allowing gas to pass through said member when the pressure is reversed; and continuing said inflation step at a rate sufficient to preclude deflation of said member except when a reversal of pressure in said system occurs.

* * * * *

UNITED STATES PATENT AND TRADEMARK OFFICE
CERTIFICATE OF CORRECTION

PATENT NO. : 4,991,879

DATED : February 12, 1991

INVENTOR(S) : Dale L. Miller

It is certified that error appears in the above-identified patent and that said Letters Patent is hereby corrected as shown below:

Claim 8, column 7, lines 11-16 should read as follows:

"A flexible coupling adapted to be positioned between two spaced apart structures adapted to be coupled together, said structues being subject to temperatures of a high magnitude to cause thermal degradation of said coupling, said coupling comprising:"

Signed and Sealed this

Seventh Day of April, 1992

*Attest:*

HARRY F. MANBECK, JR.

*Attesting Officer*     *Commissioner of Patents and Trademarks*